United States Patent
Rietveld

(10) Patent No.: US 6,413,568 B1
(45) Date of Patent: *Jul. 2, 2002

(54) METHOD AND APPARATUS FOR PRODUCING CUT FRESH CURD BLOCKS

(75) Inventor: Arnout Jan Willem Rietveld, Leeuwarden (NL)

(73) Assignee: Tetra Laval Holdings & Finance S.A., Den Haag (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/195,065

(22) Filed: Nov. 18, 1998

(51) Int. Cl.$^7$ ............................................. A23C 19/00
(52) U.S. Cl. .................. 426/582; 426/512; 426/518; 99/454; 99/456; 100/193
(58) Field of Search ................. 426/582, 512, 426/518; 99/454, 456; 100/193

(56) References Cited

U.S. PATENT DOCUMENTS

| | | | |
|---|---|---|---|
| 3,645,751 A | * 2/1972 | Wakeman et al. | 426/582 |
| 5,082,681 A | * 1/1992 | Barlow et al. | 426/495 |
| 5,175,014 A | * 12/1992 | Brockwell et al. | 426/582 |
| 5,324,529 A | * 6/1994 | Brockwell | 426/392 |

FOREIGN PATENT DOCUMENTS

| | | | |
|---|---|---|---|
| EP | 0 336 649 A | 10/1989 | |
| NL | 7612636 A | 11/1975 | |
| WO | 119127 A1 * | 9/1984 | 425/297 |
| WO | WO 93/22903 A | 11/1993 | |

* cited by examiner

Primary Examiner—Milton I. Cano
Assistant Examiner—H. Mai
(74) Attorney, Agent, or Firm—Fulbright & Jaworski L.L.P.

(57) ABSTRACT

A method and apparatus for producing cut fresh curd blocks, wherein curd blocks are formed using at least one block former, are subsequently packaged and are discharged for further handling, wherein a curd block after leaving a block former is placed in a conveying holder, the conveying holder is brought to a pressing station, and the curd block in the conveying holder is briefly pressed and subsequently transported further.

32 Claims, 6 Drawing Sheets

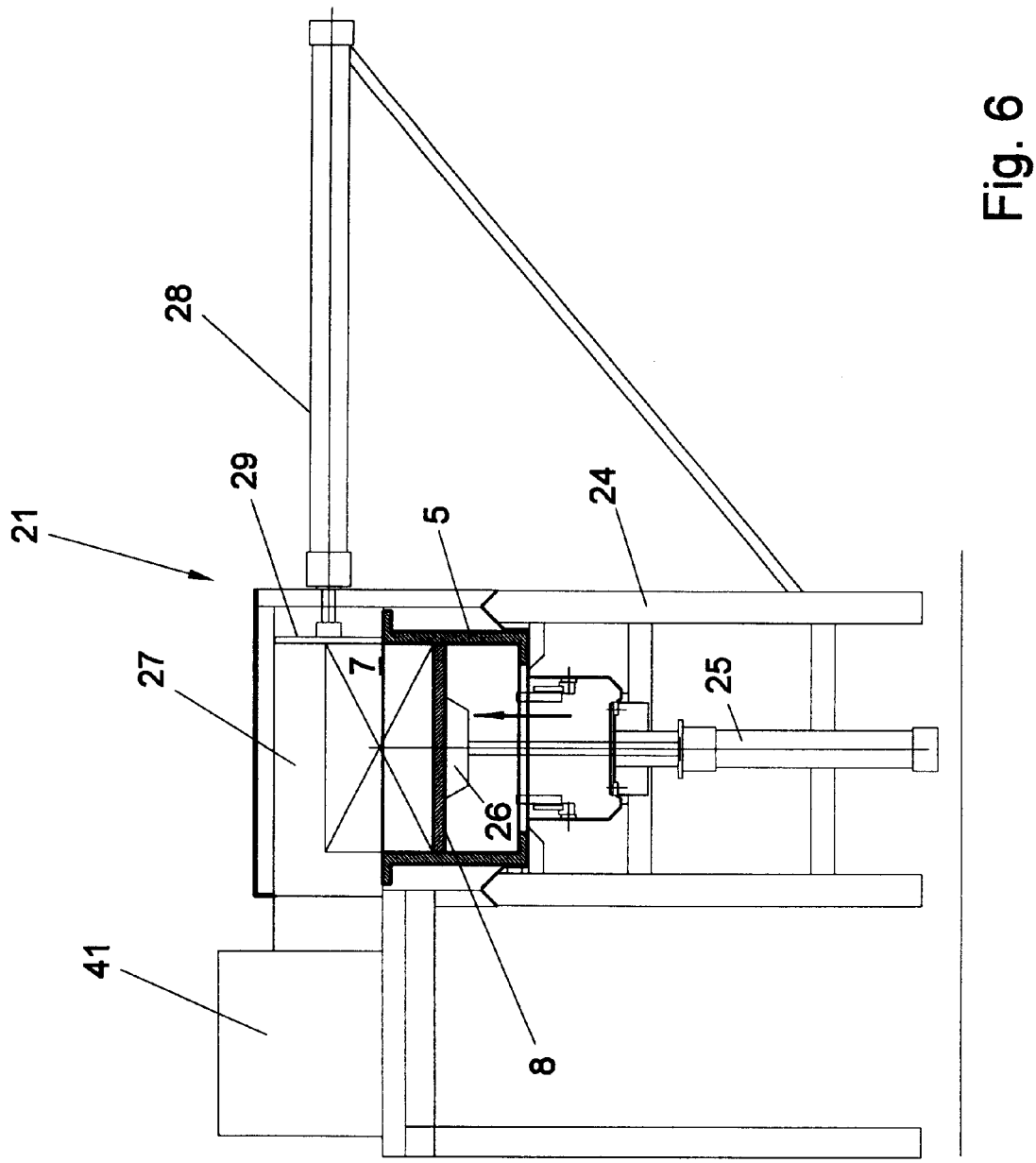

METHOD AND APPARATUS FOR PRODUCING CUT FRESH CURD BLOCKS

Figure 1:
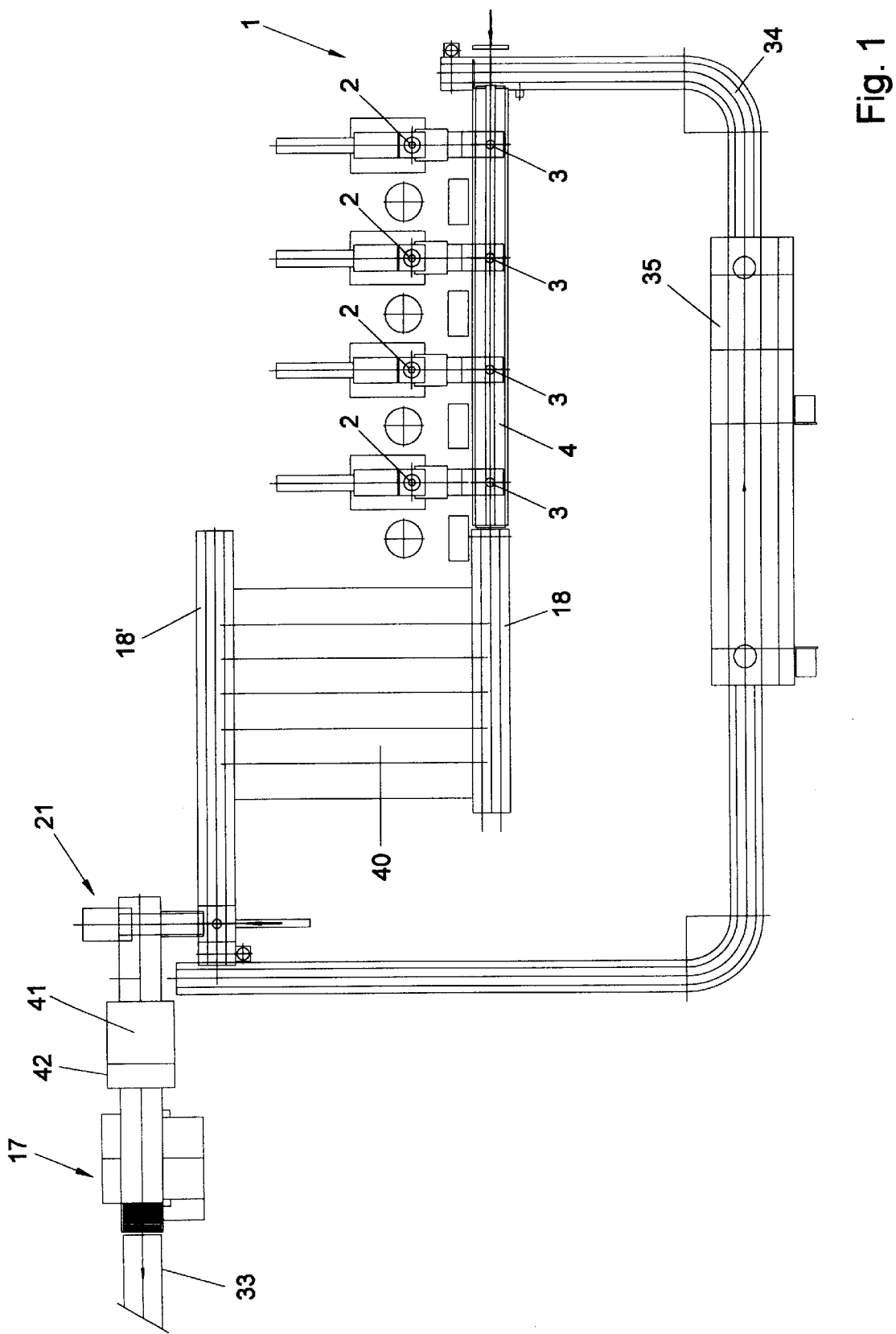

This invention relates to a method for producing cut fresh curd blocks, wherein curd blocks are formed using at least one block former, subsequently cut and discharged for further handling. This invention also relates to a cheese production apparatus in which the method can be applied.

The invention is suitable in particular for use in the production of cheddar cheese and similar cheese types. In the production of such cheese types the curd is pre-drained and dried, for instance in a cheddar machine of the type Alfomatic, and the curd thus obtained is so treated that pieces of curd, commonly referred to by the term of (curd) chips, are formed. The chips are fed to the top of a block former column, in which further consolidation and drainage occur. At the lower end of the block former, a horizontal blade is disposed, commonly referred to as guillotine blade. The guillotine blade in the rest position closes off the underside of the block former and is retracted at predetermined intervals, so that the pillar of curd situated in the block former can move downwards. While doing so, the pillar of curd is supported by a platform, also moving downwards, which in turn is supported and controlled by a pneumatic cylinder or the like. When the pillar of curd has descended over a predetermined distance, the guillotine blade moves into the rest position again, whereby a block of curd is cut off.

According to the known technique, the blocks are pushed from under the guillotine blade by a push cylinder. In the process, the block passes a guide means, which can be designed as a short horizontal tube of rectangular cross section and which terminates in front of a conveyor track. Arranged at the free end of the tube is a plastic bag of a suitable material, for instance polyethylene. A block so packed in a bag is discharged via the conveyor track, which conventionally comprises a conveyor extending in transverse direction along a number of block formers. The bags are closed and evacuated. The blocks can then be transported to a storage room to ripen.

PCT patent application WO 93/22903 (Brockwell) discloses a method of the above-described type, in which a curd block cut off by the guillotine blade, commonly referred to as "green cheese" block, prior to being packaged, is first divided into smaller portions using a number of horizontal and/or vertical blades. The blades cut through the curd block and the portions formed can then be separated and be separately packaged. Packaging occurs at some distance from the block former. The thus packaged curd blocks can then ripen further.

Often, as the curd blocks are being cut up, or prior thereto, they are trimmed, that is, cut on the outside to a neat rectangular block with straight edges.

A drawback of this known technique is that the blocks produced by a block former are sometimes very fragile. This holds in particular during the preliminary phase of the production and/or if slight malfunctions have occurred in the equipment. In such situations the curd blocks obtained may exhibit a lesser coherence than would normally be the case. If such a block is cut, this can easily give rise to damage, for instance local crumbling, which is undesired.

A drawback of trimming is that it entails trimming losses.

The object of the invention is to obviate the drawback outlined and generally to provide a method and apparatus by means of which blocks produced by a block former can be cut into smaller blocks in an efficient and reliable manner.

To that end, according to the invention, a method of the above-described type is characterized in that a curd block, after leaving a block former, is placed in a conveying holder, that the conveying holder is brought to a pressing station, and that the curd block in the conveying holder is briefly pressed and is subsequently transported further.

A cheese production apparatus comprising at least one block former and a conveyor track passing along the block former(s) is characterized, according to the invention, in that the conveyor track is arranged to convey conveying holders which in operation receive a curd block in a transfer station at the block former(s) and deliver the curd block in a removal station, and that the conveying holders, between a transfer station and a removal station, pass a pressing station where a curd block in a conveying holder is briefly pressed.

In the following, the invention is further described with reference to the accompanying drawings.

Figure 2:
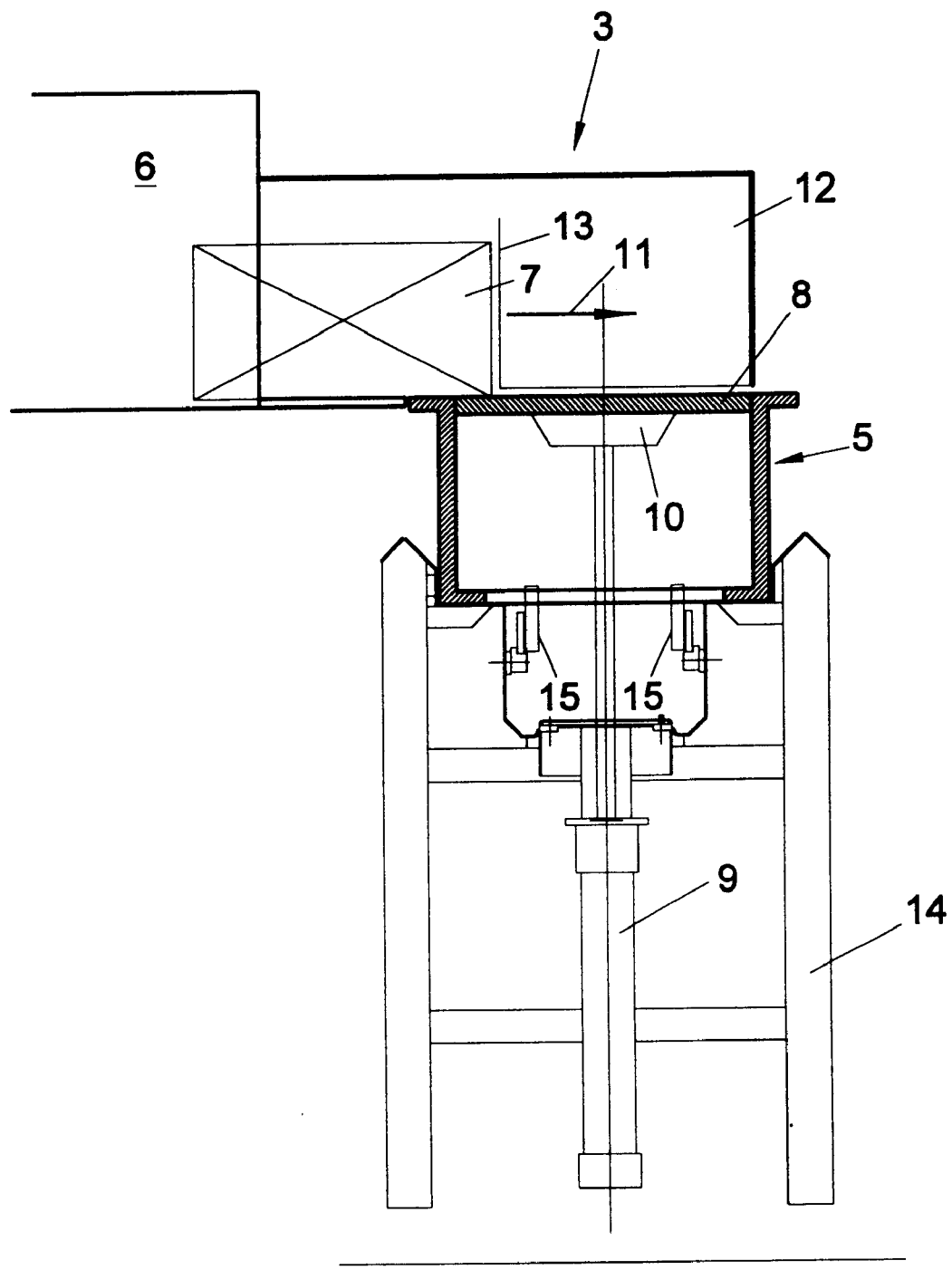
Figure 3:
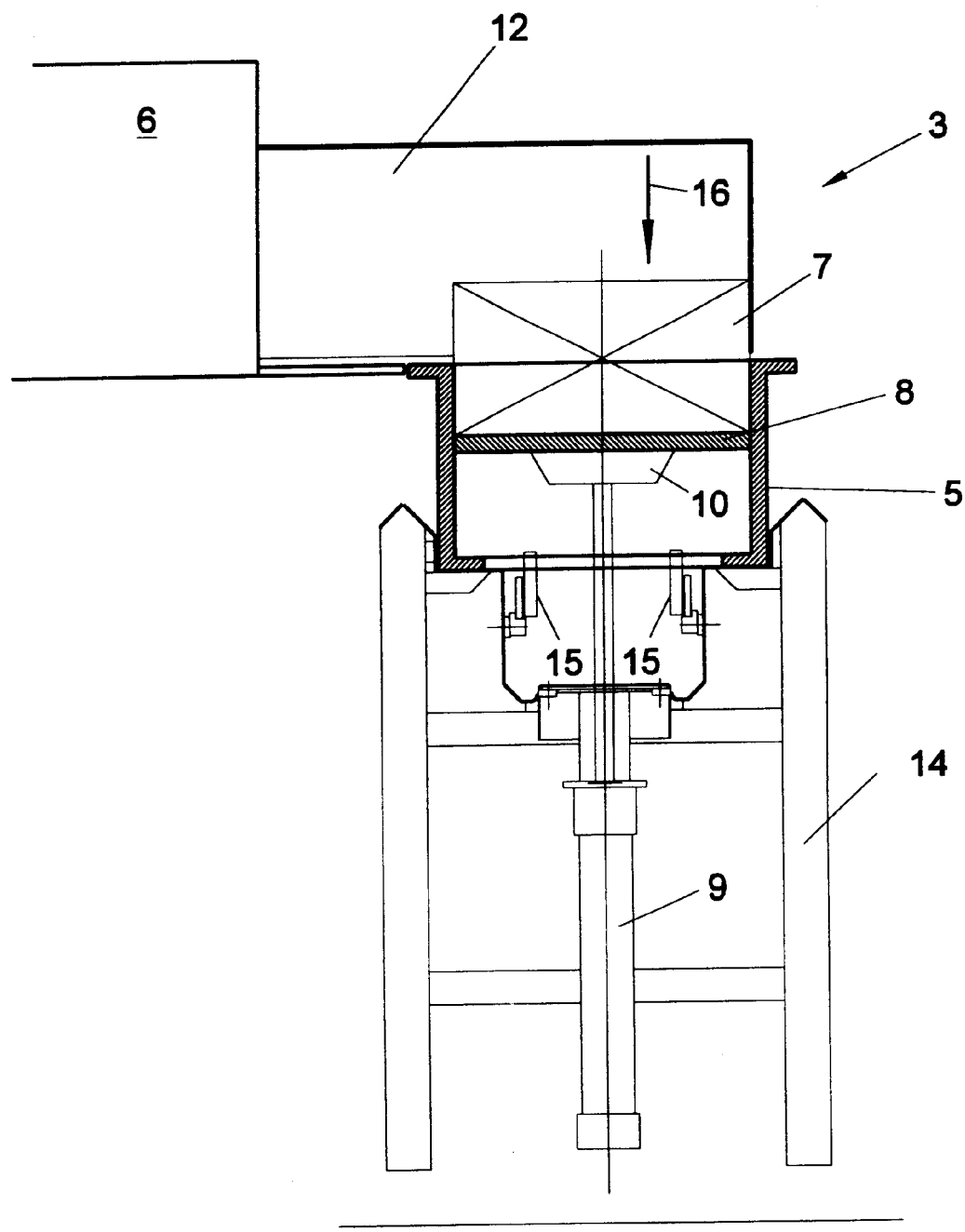
Figure 4:
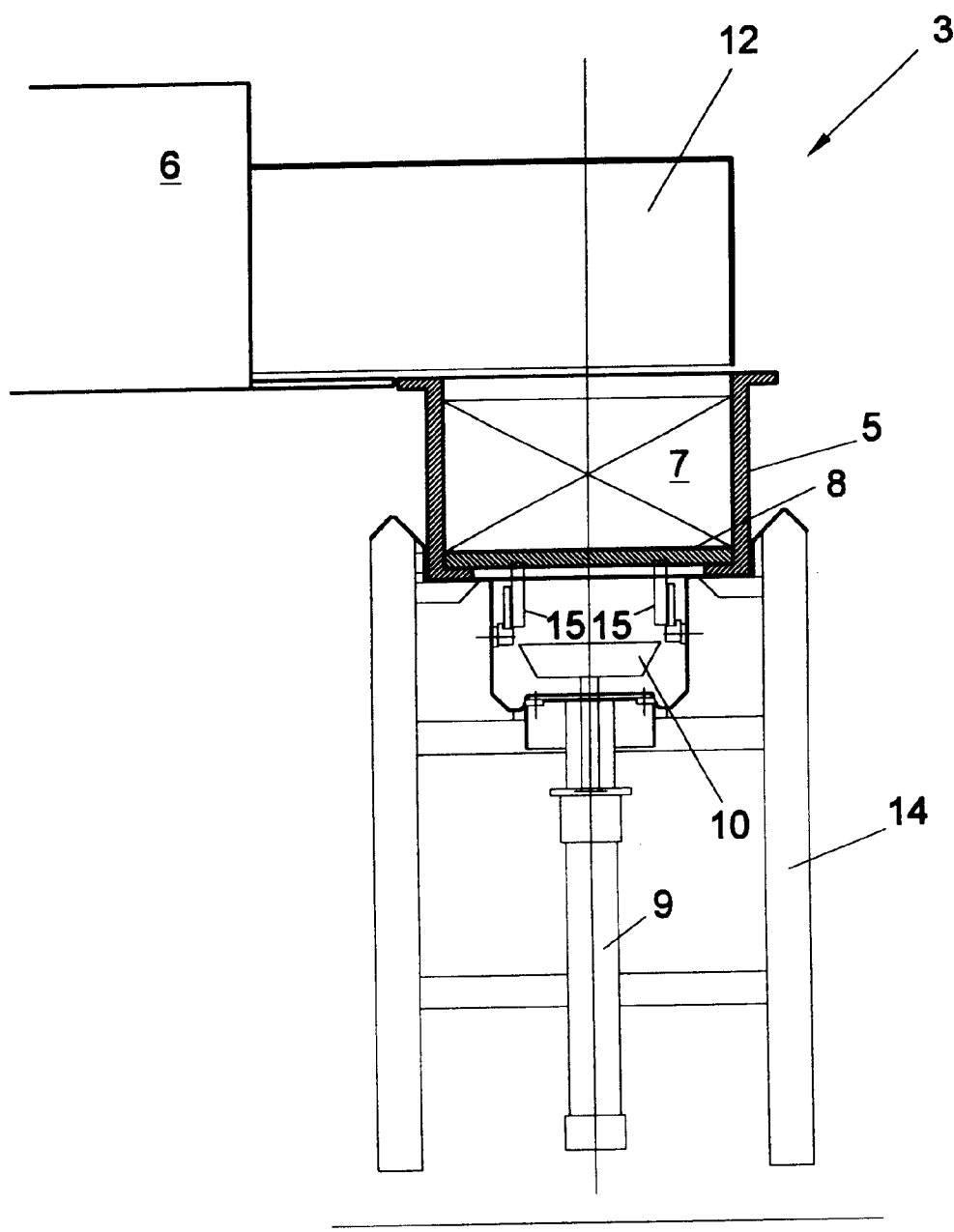
Figure 5:
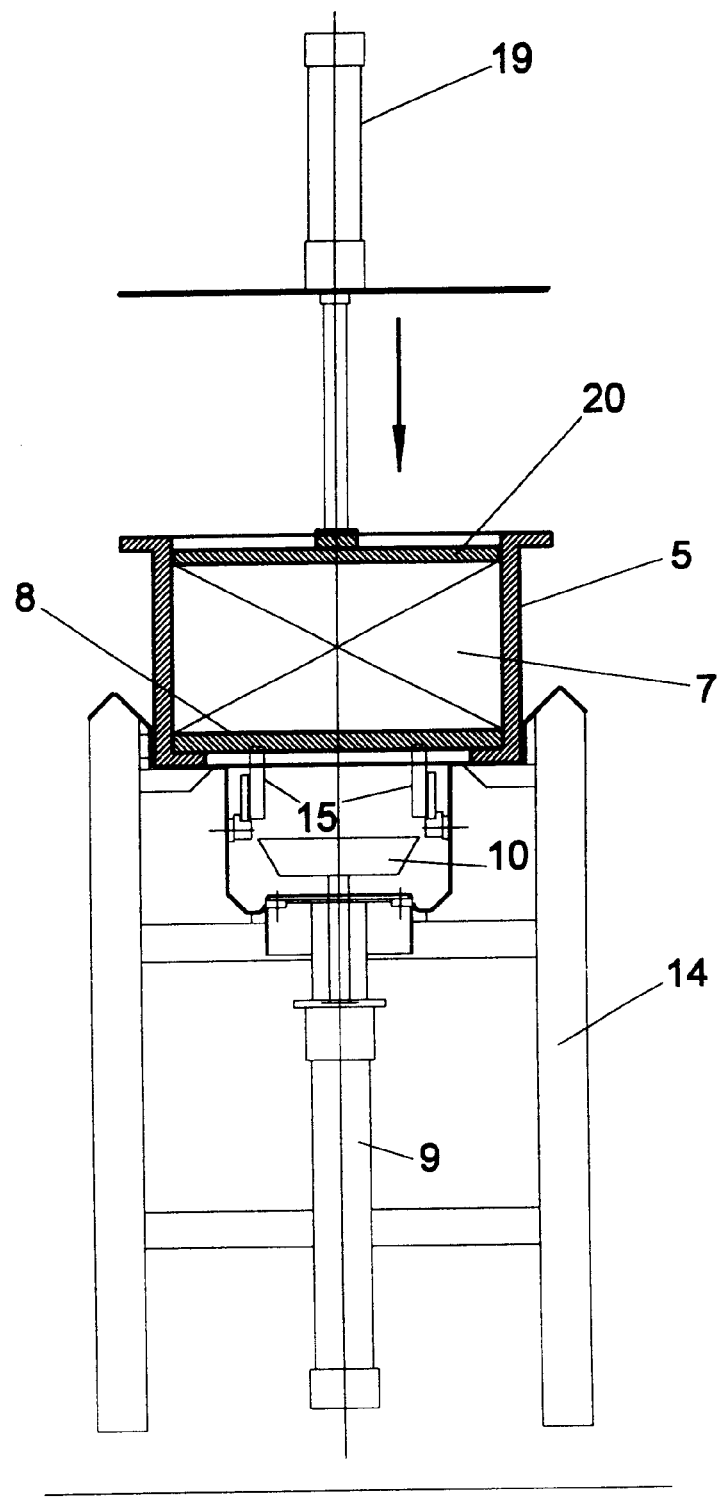

FIG. 1 schematically shows in top plan view a part of a cheese production apparatus;

FIGS. 2–4 schematically show a number of successive stages of an example of a method of transferring a curd block from a block former to a conveying holder;

FIG. 5 schematically illustrates a pre-pressing step according to the invention; and FIG. 6 schematically shows an example of a method of removing a curd block from a conveying holder.

FIG. 1 diagrammatically shows in top plan view an example of a part of a cheese production apparatus 1 in which the invention is applied. The cheese production apparatus shown comprises a number of block formers 2, four in the example shown. At the output end or front of each block former a transfer station 3 is arranged, in which the curd blocks produced by the block former are transferred to suitable conveying holders in a manner to be described in more detail hereinafter. A conveying holder, while receiving a block, is sitting on a conveyor 4, which at that moment is not driven, or which passes under the conveying holder without carrying it along. A suitable conveyor is, for instance, a carrier pawl conveyor, known per se, but other types of conveyors can also be used. For positioning the conveying holders at the proper position and for releasing them for conveyance and for switching the conveyor on and off, if necessary, suitable detectors, known per se, such as, for instance, light barriers and/or proximity switches and the like can be used.

FIGS. 2–4 each show a conveying holder 5 disposed on the conveyor 4 in a transfer station 3 in different phases of the transfer of a curd block. FIG. 2 schematically shows the lower portion 6 of a block former and a curd block 7, produced by the block former, which has already been pushed to some extent from under the block former with the aid of means known per se, not shown.

The conveying holder 5 is disposed just under the level of the curd block 7 and has a bottom 8 adapted to move up and down. The bottom 8, in the situation shown in FIG. 2, is in the uppermost position. For moving the bottom 8 up and down, a lift cylinder 9 with a stamp 10 is present, which is disposed under the conveyor track.

The curd block 7 can therefore be pushed onto the bottom disposed in its uppermost position, as indicated by an arrow 11. To prevent damage and/or deformation of the curd block, guide plates 12, of which one is visible, can be arranged on opposite sides of the path of the block as viewed in the direction of displacement (arrow 11). The guide plates can be stationary or travelling plates. At the forward end, if desired, a travelling plate 13 can be used, so that during displacement the curd block is supported by guide means on three sides. On the fourth side there is a pushing element for displacing the curd block, so that the block is supported on four sides.

When the block is disposed entirely on the lifted bottom 8 of the conveying holder, the bottom 8 can be moved down. The block then descends gradually into the conveying holder and in doing so is guided by the walls of the conveying holder and, insofar as and as long as the block still projects above the conveying holder, by the guide plates.

FIG. 2 further shows the frame 14 of the conveyor track and the pawls 15 of the pawl conveyor used in this example.

FIG. 3 shows in a similar view to FIG. 2 the situation where a curd block 7 descends into a conveying holder 5, as indicated by an arrow 16. In the situation shown in FIG. 4, the bottom 8 is in the lowermost position and the curd block 7 is received entirely within the conveying holder. The conveying holder is now ready to be conveyed further. Whether the conveyor is in fact switched on at that time, or the conveying holder is released, can depend on the phase the transfer process at other block formers served by the same conveyor is in. According to one possible practical method of operation, before conveyance commences, there is a waiting period until at each block former a filled conveying holder is ready.

According to the invention, the curd block disposed in the conveying holder is briefly pressed. This short pressing step is illustrated in FIG. 5 and can occur in a separate pressing station, indicated schematically at 40 in FIG. 1. The pressing station can be provided with a press cylinder 19, as shown in FIG. 5, which is disposed above the conveying holder and which can exert the desired pressure on the curd block via a pressure plate 20 fitting into the conveying holder and bearing on the curd block 7. In a practical situation a multiple pressing station with a number of (rows of) pressing positions can be used, the number of pressing positions being related to the number of block formers and the desired duration of pre-pressing. Through the pressing step, the stability of the curd block is increased, thereby preventing damage to the curd block while it is being cut into smaller pieces prior to packaging. Also, it has been found that pre-pressing reduces the trimming losses considerably at the least. An increase of the stability can also be desirable to prevent deformation of the freshly packaged cheese without using temporary support forms of, for instance, plastic or cardboard. Also, curd blocks which have been produced shortly after a block former has been set into operation or shortly before the end of a production cycle of a block former can have a lesser stability than the curd blocks produced during the rest of the production cycle. In those cases too, a pressing step for increasing the coherence of a curd block provides advantages.

It is noted, by way of example, that in a practical situation good results have been achieved by applying a pressure of 1200 g/cm$^2$ for about 5 minutes. Other pressures and time durations, however, are possible.

In FIG. 1 a common (multiple) pressing station for all block formers is shown. It is also possible, however, to arrange a separate, preferably multiple, pressing station at each block former. Optionally, a combination of a transfer station and a pressing station is possible. Similarly, a common cutting device, as shown schematically at 41 in FIG. 1, can be used. Alternatively, if several pressing stations are present, for each pressing station or for a number of pressing stations a separate associated cutting device can be present. In this respect, diverse variants will readily occur to those skilled in the art.

Optionally, before and/or behind the pressing station an interposed buffer conveyor 18, 18' can be used, which has a buffer function. The buffer conveyor 18, 18' can, for instance, be a conveyor of the pawl, chain or apron type. In a practical embodiment, it is possible, for instance, to use a pawl conveyor before the pressing station and to position the conveying holders before the (rows of) pressing positions. After the pressing station, advantageously, a plastic chain or apron conveyor can be used.

After the blocks have been pre-pressed in a pressing station, the blocks are removed from the conveying holders in a removal station 21 and fed to a cutting device 41. After passing a separating device 42, following the cutting device, the cut portions or cubes are fed to an automatic packaging apparatus 17. The cutting device can be designed, for instance, in the manner shown in WO 93/22903.

FIG. 6 shows a removal station 21 arranged to remove a curd block from a conveying holder. This can be done by repeating the operations carried out in the transfer stations 3 substantially in reverse order. FIG. 6 schematically shows a frame 24 of the conveyor 18, with a lift cylinder 25 under it, which is provided with a stamp 26 by which the bottom of a conveying holder with a curd block can be moved up. FIG. 6 shows a curd block 7 which has already been moved up in part. Similarly to the transfer stations, the removal station 21 can be provided with guide means for the curd block. Such a guide means is shown at 27 in FIG. 6. Operative between the guide means 27 is a pusher plate 29, operated by a cylinder 28, which can push a curd block over the fully lifted bottom 8 in the direction of a cutting device 41.

The empty conveying holders can be returned to the transfer stations 3 via a return conveyor track 34. Preferably, the return conveyor track first leads the conveying holders through a rinsing tunnel 35 for cleaning the conveying holders.

The cutting device is followed by a separating device 42 in which the smaller blocks obtained by the cutting operation can be separated from each other. If desired, it is also possible, of course, not to separate the cubes and to package them jointly. The separating device 42 is followed by an automatic packaging apparatus 17, which can place the cubes in plastic bags and can evacuate the filled bags and seal them, for instance through a sealing unit. Such packaging machines are known per se and commercially available. Finally, a discharge conveyor 33 (FIG. 1) is shown, which can discharge the packaged cubes to, for instance, a cheese store for further ripening.

As advantages of pre-pressing, the following points inter alia can be mentioned:

the quality of the curd block is less dependent on the operation of the block former;

during the cutting operation less crumbling occurs;

the dimensions of the blocks can be determined and reproduced more accurately;

the weight of the cut cubes can be determined and reproduced more accurately;

the cut cubes stick to each other to a lesser extent;

the surface of the cubes is neater and more even.

As a result, displacement and separation by means of suction pads is easier to carry out.

It is noted that after the foregoing, various modifications will readily occur to those skilled in the art. Thus, it is for instance possible to design the block formers in such a manner that the curd blocks descend into the conveying holders directly under the block formers. The conventional platform moving down under a block former is then at the same time the bottom of a conveying holder, also positioned under the block former. A horizontal push cylinder can then be dispensed with.

Further, it is possible to package the curd portions not in bags but, for instance, in evacuated foil trays, in shrink film or by the so-called flow wrapping technique or the like. Also, various types of conveyors are usable. These and similar modifications are considered to fall within the scope of the invention.

What is claimed is:

1. A method for producing cut fresh curd blocks, wherein curd blocks are subsequently packed and discharged for further handling, comprising:
   forming a plurality of curd blocks using a plurality of block former columns into which curd chips are fed and consolidated;
   after forming said curd blocks, independently moving said formed curd blocks to and into a plurality of respective conveying holders;
   thereafter conveying said conveying holders from their respectively associated curd block former columns to at least one pressing station;
   at the pressing station, applying pressure to each curd block while in its conveying holder to increase the stability of the curd block and allow the curd block to be cut into smaller pieces before packaging; and
   subsequently further transporting the conveying holders form the pressing station to a removal station, where the curd blocks are removed from the conveying holders to be subsequently fed to a cutting device.

2. a method according to claim 1, characterized in that the cutting device is used to cut a curd block into smaller blocks.

3. A method according to claim 2, characterized in that the curd block cut into smaller blocks, after cutting, is fed to a separating device for separating the smaller blocks.

4. A method according to claim 2, characterized in that a cut curd block after leaving the separating device is fed to an automatic packaging apparatus.

5. A method according to claim 1, characterized in that a curd block is pressed for about five minutes.

6. A method according to claim 1, characterized in that a pressure in the order of 1200 g/cm² is used.

7. A method according to claim 1, characterized in that conveying holders with a bottom adapted to move up and down are used.

8. A method according to claim 7, characterized in that when placing a curd block in a conveying holder, the bottom of the conveying holder is first brought into a high position at least at the level of the upper edges of the conveying holder, that subsequently the curd block is placed on the lifted bottom and that thereafter the bottom is lowered until the curd block is contained entirely within the conveying holder.

9. A method according to claim 7, characterized in that the curd block, while being placed on the lifted bottom and being lowered, is laterally supported.

10. A method according to claim 7, characterized in that a curd block upon leaving a block former is directly supported by the bottom of a conveying holder situated under the block former and lowered.

11. A method according to claim 1, characterized in that a curd block after being lowered from a block former and being cut off, is displaced from under the block former onto a lifted bottom of a conveying holder disposed in front of the block former.

12. A method according to claim 11, characterized in that a curd block while being displaced is supported on at least two sides by guide means.

13. A method according to claim 12 characterized in that the guide means travel at least partly along with the curd block.

14. A cheese production apparatus comprising a plurality of block former columns into which curd chips are fed and consolidated and a conveyor track passing along the block former columns, characterized in that the conveyor track is arranged to convey conveying holders, each of which in operation receives a curd block in a transfer station at the block former columns after the curd block is formed, and which independently transfers the curd block to and into the respective conveying holder, and delivers the curd block in a removal station, and that the conveying holders, between a transfer station and a removal station, past a pressing station where pressure is applied to a curd block in a conveying holder to increase the stability of the curd block and allow the curd block to be cut into smaller pieces before packaging.

15. A cheese production apparatus, comprising:
   a plurality of block former columns into which curd chips are fed and consolidated;
   a plurality of transfer stations;
   a plurality of conveyor holders, at least one for each of said curd block former columns, for receiving curd blocks from curd block former columns after said curd blocks are formed and independently transferring them to and into respective conveyor holders;
   a removal station wherein said curd blocks are removed from said conveying holders; and
   at least one processing station between said transfer station and said removal station where pressure can be applied to the curd blocks in the conveying holders to increase the stability of the curd block and the curd block to be cut into smaller pieces before packaging; and
   a cutting device following the transfer station, for cutting a curd block into smaller blocks.

16. A cheese production apparatus according to claim 15, characterized in that a separating device is located after the cutting device.

17. A cheese production apparatus according to claim 16, characterized by an automatic packaging apparatus connecting to the separating device.

18. A cheese production apparatus as claimed in claim 15 wherein the conveyor track at the removal station connects to a return conveyor track for returning empty holders to the transfer stations.

19. A cheese production apparatus according to claim 18, characterized in that the return conveyor track passes along a cleaning station.

20. A cheese production apparatus according to claim 15, characterized in that the conveying holders are box-like holders open at the top and having a bottom adapted to be moved up and down.

21. A cheese production apparatus according to claim 20, characterized in that the transfer station and/or the removal station comprise lifting means to move the bottom of a conveying holder between a lowermost position at the level of the lower edges of the conveying holders and an uppermost position at the level of the upper edges of the conveying holders or higher.

22. A cheese production apparatus according to claim 21, characterized in that the removal station is provided with a pushing element to push a curd block off a bottom of a conveying holder disposed in the lifted position.

23. A cheese production apparatus according to claim 21, characterized in that the transfer station is provided with a pushing element to push a curd block onto a bottom of a conveying holder disposed in the lifted position.

24. A cheese production apparatus according to claim 22, characterized by guide means which support a curd block on at least two sides during at least the operation of a pushing element.

25. A cheese production apparatus according to claim 24, characterized in that the guide means during the upward or downward movement of a curd block placed on the bottom of a conveying holder operatively support the curd block insofar as it projects above the conveying holder.

26. A cheese production apparatus according to claim 15, characterized in that the transfer station is disposed under a block former and that the conveyor track is arranged to pass the conveying holders under the block former for the conveying holders to receive directly a curd block descending from the block former.

27. A cheese production apparatus according to claim 15, characterized in that the front of each block former a transfer station is arranged and that pushing means are provided, capable of pushing a curd block formed by the block former, after it has been cut off, into the transfer station.

28. A cheese production apparatus according to claim 15, characterized in that the packaging apparatus is arranged for vacuum-packaging the cut curd blocks in bags.

29. A cheese production apparatus according to claim 15, characterized in that the packaging apparatus is arranged for packaging the curd blocks in a film or foil packaging.

30. A method according to claim 3, characterized in that a cut curd block after leaving the separated device is fed to an automatic packaging apparatus.

31. A cheese production apparatus according to claim 23, characterized by guide means which support a curb block on at least two sides during at least the operation of a pushing elements.

32. A cheese production apparatus according to claim 25, characterized in that transfer station is disposed under a block former and that the conveyor track is arranged to pass the conveying holders under the block former for the conveying holders to receive directly a curd block descending from the block former.

* * * * *